United States Patent
Hemingway et al.

(10) Patent No.: US 12,208,785 B2
(45) Date of Patent: Jan. 28, 2025

(54) PREDICTIVE CONTROL OF A VEHICLE POWER INVERTER

(71) Applicant: JAGUAR LAND ROVER LIMITED, Coventry (GB)

(72) Inventors: Blake Hemingway, Coventry (GB); Matthew Hancock, Rugby (GB)

(73) Assignee: Jaguar Land Rover Limited, Warwickshire (GB)

( * ) Notice: Subject to any disclaimer, the term of this patent is extended or adjusted under 35 U.S.C. 154(b) by 0 days.

(21) Appl. No.: 18/265,390

(22) PCT Filed: Dec. 3, 2021

(86) PCT No.: PCT/EP2021/084269
§ 371 (c)(1),
(2) Date: Jun. 5, 2023

(87) PCT Pub. No.: WO2022/117873
PCT Pub. Date: Jun. 9, 2022

(65) Prior Publication Data
US 2024/0051515 A1 Feb. 15, 2024

(30) Foreign Application Priority Data

Dec. 4, 2020 (GB) ...................... 2019137

(51) Int. Cl.
*B60W 20/11* (2016.01)
*B60K 6/448* (2007.10)
(Continued)

(52) U.S. Cl.
CPC ............ *B60W 20/11* (2016.01); *B60W 10/08* (2013.01); *B60W 20/20* (2013.01); *B60W 2510/083* (2013.01); *B60W 2710/086* (2013.01)

(58) Field of Classification Search
CPC ...... B60W 20/11; B60W 20/20; B60W 10/08; B60W 2510/083; B60W 2710/086;
(Continued)

(56) References Cited

U.S. PATENT DOCUMENTS 5,722,502 A * 3/1998 Kubo .................... B60W 10/02
180/65.23
2011/0301792 A1 12/2011 Yamazaki
(Continued)

FOREIGN PATENT DOCUMENTS

EP 0725474 A1 8/1996
JP H09286252 A * 11/1997 ............. Y02T 10/62
(Continued)

OTHER PUBLICATIONS

International Search Report and Written Opinion for Application No. PCT/EP2021/084269, dated Apr. 4, 2022, 23 pages.
(Continued)

*Primary Examiner* — Tinh Dang
(74) *Attorney, Agent, or Firm* — Reising Ethington P.C.

(57) ABSTRACT

A control system (208) for controlling a power inverter (214) of a vehicle (10), the vehicle comprising a first torque source (202), the power inverter for an electric machine (216) coupled to the first torque source, and a second torque source (212), the control system comprising one or more controllers (300), wherein the control system is configured to:

enable (412) the power inverter to transition from an active state to a standby state in dependence on the first torque source being inactive while the second torque source is active (400), wherein the standby state is configured to inhibit quiescent electrical current draw by the power inverter;

receive information on which an activation condition depends, the activation condition configured to cause at least activation of the first torque source;

(Continued)

determine (404, 408) that a predictive condition for a requirement of the activation condition is satisfied, in dependence on the received information; and request (410) the power inverter to transition from the standby state to an active state in dependence on satisfaction of the predictive condition.

20 Claims, 3 Drawing Sheets (51) Int. Cl.
  *B60W 10/08* (2006.01)
  *B60W 20/10* (2016.01)
  *B60W 20/20* (2016.01)

(58) Field of Classification Search
  CPC ...... B60W 10/04; B60W 10/06; B60W 20/00; B60L 2240/526; B60L 2240/529; B60L 2250/26; B60L 2260/26; B60L 2260/50; B60L 50/16; Y02T 10/92; B60K 6/44; B60K 6/20; B60K 6/448
  See application file for complete search history.

(56) References Cited

U.S. PATENT DOCUMENTS

| | | | | |
|---|---|---|---|---|
| 2014/0121867 A1* | 5/2014 | Tamai | ............... | B60W 10/08 180/65.265 |
| 2017/0334434 A1 | 11/2017 | Iwamitsu et al. | | |

FOREIGN PATENT DOCUMENTS

| | | | | |
|---|---|---|---|---|
| JP | 3584625 B2 * | 11/2004 | ............... | B60K 6/26 |
| KR | 20190027386 A | 3/2019 | | |
| WO | 2018011483 A1 | 1/2018 | | |

OTHER PUBLICATIONS

Combined Search and Examination Report for Application No. GB2019137.5, dated Sep. 30, 2021, 4 pages.

Further Search Report for Application No. GB2019137.5, dated Nov. 24, 2021, 2 pages.

European Office Action corresponding to application 21 836 011.3, dated Oct. 24, 2024, 4 pages.

* cited by examiner

PREDICTIVE CONTROL OF A VEHICLE POWER INVERTER

TECHNICAL FIELD

The present disclosure relates to predictive control of a vehicle power inverter. In particular, but not exclusively it relates to predictive control of a power inverter for a starter-generator of a hybrid vehicle.

BACKGROUND

A vehicle comprising a first torque source and an electric machine coupled to the first torque source is known. It is known for the first torque source to comprise an internal combustion engine and for the electric machine to comprise a starter-generator. It is known for the starter-generator to be connected to a power inverter for inverting a direct current (DC) supply into an alternating current (AC) waveform for the electric machine. The power inverter may be active (primed) at all times during a drive cycle including while there is no torque throughput and while it is not needed. The inverter will not be a source of substantial latency in the powertrain of the vehicle because the inverter will maintain magnetic flux at the electric machine and because there is no communication round-trip time associated with the inverter controller reporting torque availability.

SUMMARY OF THE INVENTION

It is an aim of the present invention to provide improved control of the power inverter. The invention is as defined in the appended independent claims.

According to an aspect of the invention there is provided a control system for controlling a power inverter of a vehicle, the vehicle comprising a first torque source, the power inverter for an electric machine coupled to the first torque source, and a second torque source, the control system comprising one or more controllers, wherein the control system is configured to: enable the power inverter to transition from an active state to a standby state in dependence on the first torque source being inactive while the second torque source is active, wherein the standby state is configured to inhibit quiescent electrical current draw by the power inverter; receive information on which an activation condition depends, the activation condition configured to cause at least activation of the first torque source; determine that a predictive condition for a requirement of the activation condition is satisfied, in dependence on the received information; and request the power inverter to transition from the standby state to an active state in dependence on satisfaction of the predictive condition.

An advantage is optimised control of the power inverter. This is because the standby mode enables minimum electrical current draw during driving by the second torque source, thereby extending range and improving energy efficiency, and because the predictive condition enables minimum latency on activation of the first torque source.

In some examples, the received information comprises information indicative of a request for torque.

In some examples, the information indicative of a request for torque is based on accelerator position.

In some examples, the predictive condition is configured to be satisfied when the information indicative of a request for torque exceeds a threshold.

In some examples, the value of the threshold is below a different threshold for satisfaction of the activation condition, so that the predictive condition is satisfiable before the activation condition but the activation condition is not satisfiable before the predictive condition.

In some examples, the threshold is a value corresponding to more than 50% of an upper limit value.

In some examples, the predictive condition is dependent on the information indicative of a request for torque indicating a user-initiated request for torque but is not based exclusively on information indicating an automatically-initiated request for torque.

In some examples, the activation condition is configured to be satisfied when the information indicative of a request for torque exceeds an activation threshold.

In some examples, the activation threshold is a value configured to be reachable after the predictive condition has been satisfied.

In some examples, the value of the activation threshold corresponds to more than 80% of an upper limit value.

In some examples, the activation condition comprises a system-initiated activation condition for causing activation of the first torque source, and wherein the received information comprises information capable of satisfying, at least in part, the system-initiated activation condition.

In some examples, the information capable of satisfying, at least in part, the system-initiated activation condition comprises information indicative of energy available to the second torque source.

In some examples, the received information comprises information indicative of vehicle speed.

In some examples, enabling the power inverter to transition from the active state to the standby state is further dependent on which one of a plurality of selectable configurations associated with torque from the first torque source is currently selected.

In some examples, in the standby state, one or more bipolar transistors of the power inverter are electrically disconnected.

In some examples, the control system is configured to delay initiation of the transition from the active state to the standby state but not delay initiation of the transition from the standby state to the active state.

In some examples, the control system is configured to: determine whether the power inverter has satisfied a successful transition condition for the transition from the standby state to the active state; in dependence on satisfaction of the successful transition condition, enable the electric machine to activate the first torque source when the activation condition is satisfied; and in dependence on non-satisfaction of the successful transition condition, enable a starter motor not dependent on the power inverter to activate the first torque source when the activation condition is satisfied.

In some examples, the successful transition condition is dependent on whether the transition from the standby state to the active state is completed within a time limit.

In some examples, the control system is configured to: determine whether an electric vehicle mode causing the first torque source to be inactive while the second torque source is active was initiated by a driver or was initiated automatically; and in dependence on the determination, either: enable the transition from the active state to the standby state if the electric vehicle mode was initiated by the driver but not if the electric vehicle mode was initiated automatically; or determine at least the predictive condition depending on whether the electric vehicle mode was initiated by the driver or was initiated automatically.

In some examples, the first torque source comprises an internal combustion engine and/or wherein the electric machine comprises a starter-generator and/or wherein the second torque source comprises an electric machine.

According to a further aspect of the invention there is provided a method of controlling a power inverter of a vehicle, the vehicle comprising a first torque source, and the power inverter for an electric machine coupled to the first torque source, the method comprising: enabling the power inverter to transition from an active state to a standby state in dependence on the first torque source being inactive while the second torque source is active, wherein the standby state is configured to inhibit quiescent electrical current draw by the power inverter; receiving information on which an activation condition depends, the activation condition configured to cause at least activation of the first torque source; determining that a predictive condition for a requirement of the activation condition is satisfied, in dependence on the received information; and requesting the power inverter to transition from the standby state to an active state in dependence on satisfaction of the predictive condition.

According to a further aspect of the invention there is provided a control system for controlling a power inverter of a vehicle, the vehicle comprising a first torque source, and the power inverter for an electric machine coupled to the first torque source, the control system comprising one or more controllers, wherein the control system is configured to: enable the power inverter to transition from an active state to a standby state in dependence on the first torque source being inactive, wherein the standby state is configured to inhibit quiescent electrical current draw by the power inverter; determine satisfaction of a condition indicative of requiring activation of the power inverter; request the power inverter to transition from the standby state to an active state in dependence on satisfaction of the condition; determine whether the power inverter has satisfied a successful transition condition for transitioning from the standby state to the active state; in dependence on satisfaction of the successful transition condition, enable the electric machine to activate the first torque source; and in dependence on non-satisfaction of the successful transition condition, enable a starter motor not dependent on the power inverter to activate the first torque source.

According to a further aspect of the invention there is provided a method of controlling a power inverter of a vehicle, the vehicle comprising a first torque source, and the power inverter for an electric machine coupled to the first torque source, the method comprising: enabling the power inverter to transition from an active state to a standby state in dependence on the first torque source being inactive, wherein the standby state is configured to inhibit quiescent electrical current draw by the power inverter; determining satisfaction of a condition indicative of requiring activation of the power inverter; requesting the power inverter to transition from the standby state to an active state in dependence on satisfaction of the condition; determining whether the power inverter has satisfied a successful transition condition for transitioning from the standby state to the active state; in dependence on satisfaction of the successful transition condition, enabling the electric machine to activate the first torque source; and in dependence on non-satisfaction of the successful transition condition, enabling a starter motor not dependent on the power inverter to activate the first torque source.

According to a further aspect of the invention there is provided a vehicle comprising the control system.

According to a further aspect of the invention there is provided computer software that, when executed, is arranged to perform any one or more of the methods described herein. According to a further aspect of the invention there is provided a non-transitory computer readable medium comprising computer readable instructions that, when executed by a processor, cause performance of any one or more of the methods described herein.

The one or more controllers may collectively comprise: at least one electronic processor having an electrical input for receiving information; and at least one electronic memory device electrically coupled to the at least one electronic processor and having instructions stored therein; and wherein the at least one electronic processor is configured to access the at least one memory device and execute the instructions thereon so as to cause the control system to cause performance of the method.

Within the scope of this application it is expressly intended that the various aspects, embodiments, examples and alternatives set out in the preceding paragraphs, in the claims and/or in the following description and drawings, and in particular the individual features thereof, may be taken independently or in any combination that falls within the scope of the appended claims. That is, all embodiments and/or features of any embodiment can be combined in any way and/or combination that falls within the scope of the appended claims, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
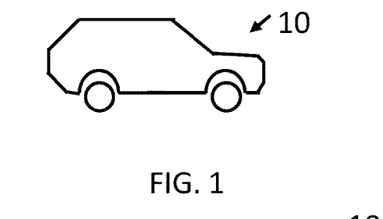
FIG. 1 illustrates an example of a vehicle.

FIG. 1 illustrates an example of a vehicle 10 in which embodiments of the invention can be implemented. In some, but not necessarily all examples, the vehicle 10 is a passenger vehicle, also referred to as a passenger car or as an automobile. In other examples, embodiments of the invention can be implemented for other applications, such as commercial vehicles.

Figure 2:
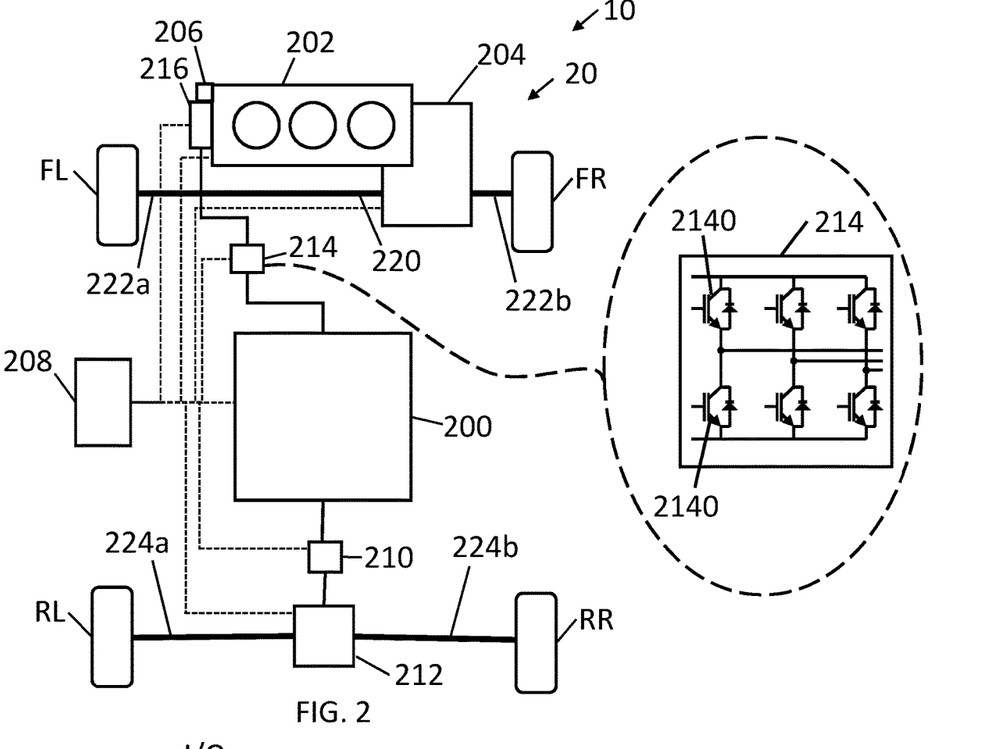
FIG. 2 illustrates an example of a system.

The vehicle 10 comprises a plurality of torque sources such as the torque sources 202, 212 shown in FIG. 2. A torque source refers to a prime mover, such as an engine, an electric machine, or the like. The vehicle 10 comprises a first torque source 202 configured to provide torque to a first axle of the vehicle 10 for generating first axle wheel torque. The vehicle 10 further comprises a second torque source 212 configured to provide torque to a second axle of the vehicle 10 for generating second axle wheel torque.

In some examples, one of the torque sources may comprise an engine 202 and the other torque source may comprise an electric machine 212.

The vehicle 10 may be a hybrid electric vehicle (HEV) such as a plugin HEV (PHEV). The vehicle 10 may be configured to operate as a parallel HEV. Parallel HEVs comprise a torque path 220 between the engine 202 and at least one vehicle wheel (e.g. FL, FR), as well as a torque path between an electric machine 212 and at least one vehicle wheel (e.g. RL, RR). The torque path 220 may be disconnectable by a torque path connector such as a clutch or transmission.

Typically, parallel HEVs differ from Series HEVs, because in Series HEVs the purpose of the engine 202 is to generate electrical energy and there is no torque path between the engine 202 and vehicle wheels. However, some types of parallel HEVs may be configurable to operate as a series HEV, such as 'through-the-road' hybrids. In this case we may usefully describe such a hybrid vehicle as operating in a parallel HEV mode or in a series HEV mode, depending on whether torque is being delivered from the engine 202 directly to the vehicle wheels.

FIG. 2 schematically illustrates an example system 20 for a 'through the road' HEV 10. The system 20 comprises the first torque source 202, a power inverter 214 for an electric machine 216 coupled to the first torque source 202 (e.g. via a belt/chain), a second torque source 212, and other features. In an alternative implementation, the vehicle 10 may be other than shown in FIG. 2.

The first torque source in FIG. 2 comprises an engine 202. The engine 202 is an internal combustion engine (ICE). The illustrated engine 202 comprises three combustion chambers, however a different number of combustion chambers may be provided in other examples. A starter motor 206 may be provided for starting the engine 202. The starter motor 206 may comprise a pinion starter for example, which is typically a DC motor.

The system 20 comprises a transmission 204 for receiving output torque from the engine 202. The transmission comprises a plurality of selectable gear reductions, e.g. more than four. In some examples the transmission 204 comprises a transmission park pawl that prevents wheel rotation when a 'Park' position is selected by a transmission gear selector. The transmission 204 may comprise an automatic vehicle transmission, a manual vehicle transmission, or a semi-automatic vehicle transmission.

When driving forward, the engine 202 is mechanically connected (coupled) or connectable (couplable) to provide positive torque to a first set of vehicle wheels (FL, FR) via a torque path 220. The torque path 220 extends from an output of the engine 202 to the transmission 204, then and then to a first set of vehicle wheels (FL, FR) via a first axle or axles 222a, 222b. In a vehicle overrun and/or friction braking situation, negative torque may flow from the first set of vehicle wheels (FL, FR) to the engine 202.

The illustrated first set of vehicle wheels (FL, FR) comprises front wheels, and the axles 222a, 222b are front transverse axles. Therefore, the system 20 is configured for front wheel drive by the engine 202. Additionally, or alternatively, the first set of vehicle wheels can comprise rear wheels (RL, RR). The illustrated first set of vehicle wheels (FL, FR) is a pair of vehicle wheels, however a different number of vehicle wheels and axles could be provided in other examples.

In the illustrated system 20, no longitudinal (centre) driveshaft is provided, to make room for hybrid vehicle components. Therefore, the engine 202 is not connectable to a second set of rear wheels (rear wheels RL, RR in the illustration). The engine 202 may be transverse mounted to save space. In an alternative example, the engine 202 may be configured to drive the front and rear wheels.

The system 20 comprises a first electric machine 216, which is the electric machine coupled to the first torque source 202. The first electric machine 216 may be an alternating current induction motor or a permanent magnet motor, or another type of motor. The first electric machine 216 may be located so that when the torque path 220 is disconnected from the first set of vehicle wheels (FL, FR), the first electric machine 216 is also disconnected.

The first electric machine 216 may be mechanically connected (coupled) or connectable (couplable) to the engine 202 via a belt or chain. For example, the first electric machine 216 may be a starter-generator such as a belt integrated starter generator (BISG). The first electric machine 216 and the engine 202 together form a torque source for the first set of vehicle wheels (FL, FR). In the illustration, the first electric machine 216 is located at an accessory drive end of the engine 202, opposite a vehicle transmission end of the engine 202. In an alternative example, the first electric machine 216 is a crankshaft integrated motor generator (CIMG), located at a vehicle transmission end of the engine 202. In further examples, the first electric machine 216 could be further downstream along the torque path 220.

The first electric machine 216 is configured to apply positive torque and configured to apply negative torque to a crankshaft of the engine 202, for example to provide functions such as one or more of: boosting output torque of the engine 202; deactivating (shutting off) the engine 202 while at a stop or coasting; activating (starting) the engine 202; generating power for ancillary loads; and/or regenerative braking in a regeneration mode. In a parallel HEV mode, the engine 202 and first electric machine 216 may both be operable to supply positive torque simultaneously to boost output torque. The first electric machine 216 may be incapable of sustained electric-only driving. In an alternative example, the first electric machine 216 is not controllable to provide positive torque other than to start the engine 202. In further examples, a pinion starter 206 is additionally provided as a secondary backup (or primary) for starting the engine 202.

FIG. 2 illustrates the second torque source 212 in the form of a second electric machine. The second electric machine 212 can also be referred to as an electric traction motor. Another term for the second electric machine 212 is an electric drive unit. In the illustrated example, the second electric machine 212 is configured to enable at least an electric vehicle mode comprising electric-only driving. In some, but not necessarily all examples, a nominal maximum torque of the second electric machine 212 is greater than a nominal maximum torque of the first electric machine 216. In some, but not necessarily all examples, the nominal maximum torque of the second electric machine 212 is greater than a nominal maximum torque of the engine 202.

Even if the torque path 220 between the engine 202 and the first set of vehicle wheels (FL, FR) is disconnected, the vehicle 10 can be driven in electric vehicle mode because the second electric machine 212 is mechanically connected to at least one vehicle wheel.

The illustrated second electric machine 212 is configured to provide torque to the illustrated second set of vehicle wheels (RL, RR). The second set of vehicle wheels (RL, RR) comprises vehicle wheels not from the first set of vehicle wheels (FL, FR). The illustrated second set of vehicle wheels (RL, RR) comprises rear wheels, and the second electric machine 212 is operable to provide torque to the rear wheels RL, RR via a second, rear transverse axle or axles 224a, 224b. Therefore, the illustrated vehicle 10 is rear wheel driven in electric vehicle mode. In an alternative example, the second set of vehicle wheels comprises at least one vehicle wheel of the first set of vehicle wheels. In a further alternative example, the second electric machine 212 is configured to provide torque to the first set of vehicle wheels (e.g. FL, FR). In a further alternative implementation, the second electric machine 212 is replaced with two electric machines, one for each of the second set of vehicle wheels.

The torque path 220 between the engine 202 and the first set of vehicle wheels (FL, FR) may be disconnectable in an electric vehicle mode, to reduce parasitic pumping energy losses. For example, the transmission 204 may be shifted into neutral. In the example of FIG. 2, this means that the first electric machine 216 will also be disconnected from the first set of vehicle wheels (FL, FR).

Another benefit of the second electric machine 212 is that the second electric machine 212 may also be configured to be operable in a parallel HEV mode, to enable multi-axle drive (e.g. all-wheel drive) operation in conjunction with the engine 202, despite the absence of a centre longitudinal driveshaft.

In order to store electrical energy for the electric machines, the system 20 comprises an electrical energy storage means such as a traction battery 200. The traction battery 200 provides a nominal voltage required by electrical power users such as the electric machines.

The traction battery 200 may be a high voltage battery. High voltage traction batteries provide nominal voltages in the hundreds of volts. The traction battery 200 may have a voltage and capacity to support electric only driving for sustained distances. The traction battery 200 may have a capacity of several kilowatt-hours, to maximise range. The capacity may be in the tens of kilowatt-hours, or even over a hundred kilowatt-hours.

Although the traction battery 200 is illustrated as one entity, the function of the traction battery 200 could be implemented using a plurality of small traction batteries in different locations on the vehicle 10.

The first electric machine 216 and second electric machine 212 may be configured to receive electrical energy from the same traction battery 200 as shown.

The system 20 further comprises a control system 208 configured to implement any one or more of the control strategies described herein. The control system 208 comprises one or more controllers. The control system 208 may comprise an engine start controller.

Figure 3A:
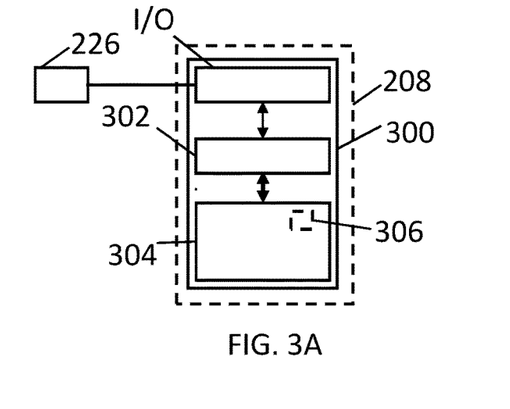
FIGS. 3A, 3B illustrate an example of a control system and of a non-transitory computer-readable storage medium.

FIG. 3A schematically illustrates how a control system 208 may be implemented. The control system 208 of FIG. 3A comprises at least one controller 300. In some examples, the control system 208 comprises a plurality of controllers on-board and/or off-board the vehicle 10. The controller 300 of FIG. 3A includes at least one processor 302; and at least one memory device 304 electrically coupled to the electronic processor 302 and having instructions 306 (e.g. a computer program) stored therein, the at least one memory device 304 and the instructions 306 configured to, with the at least one processor 302, cause any one or more of the methods described herein to be performed. The processor 302 may have an electrical input/output I/O or electrical input for receiving information and interacting with external components 226 such as an accelerator pedal.

Figure 3B:
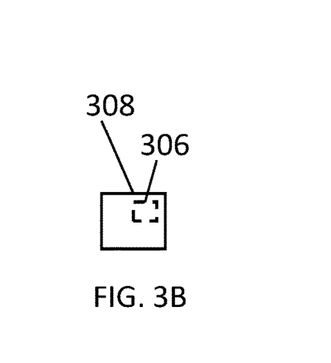

FIG. 3B illustrates a non-transitory computer-readable storage medium 308 comprising the instructions 306 (computer software).

The illustrated system 20 comprises power inverters. Two power inverters 210, 214 are shown, one for each electric machine 212, 216. In other examples, one power inverter or more than two power inverters could be provided.

A power inverter herein comprises a circuit configured to invert (DC-AC) and/or rectify (AC-DC) an electrical waveform, to act as an interface between a DC bus for the energy storage means 200, and an AC bus for the AC electric machine 212, 216.

Aspects of the present disclosure relate to the control of the power inverter 214 for the first electric machine 216. FIG. 2 includes a detail view schematically illustrating an example of a general circuit topology of the power inverter 214, with much implementation detail omitted. There are different possible topologies and control strategies for automotive power inverters, applicable to this disclosure.

As illustrated in the detail view, the power inverter 214 comprises a plurality of semiconductor switches 2140 arranged in a circuit configured to shape the waveform (e.g. via pulse width modulation). In this example, the semiconductor switches 2140 comprise bipolar transistors. Bipolar transistors generally require constant power input when they are in-circuit (primed, electrically connected), even if there is no torque request-based electrical energy throughput. Therefore, the power inverter 214 draws quiescent electrical current draw even when it is not throughputting electrical energy (0 Nm torque request).

The bipolar transistors 2140 may comprise insulated gate bipolar transistors. In the detail view, but not necessarily in all examples, the topology is a three-phase topology. In the detail view, but not necessarily in all examples, the topology is a six-switch topology. The topology may comprise three single-phase power inverter switch arrangements each connected to a different one of three load terminals. The quiescent electrical current draw may be in the high tens of watts.

Electrical energy throughput as mentioned above can be a function of a torque request output from the control system 208. A torque request is converted into an AC current through the power inverter 214 in order to fulfil the torque request at the first electric machine 216. The torque request may be an arbitrated torque request dependent on a plurality of different torque requestors, including but not limited to a user torque request from a human-machine interface (HMI) such as an accelerator (e.g. accelerator pedal).

A torque request that results in electrical energy through the power inverter 214 can be positive (e.g. engine start/torque boost) or negative (e.g. battery charging).

A user torque request can be a function of a position of the HMI (e.g. accelerator pedal position between 0% and 100%). An accelerator position sensed by an accelerator position sensor is therefore an example of information indicative of a user-initiated request for torque.

If an autonomous driving function is available and active (e.g. cruise control), a torque request based on a setpoint of the autonomous driving function is regarded as an automatically-initiated request for torque.

When the vehicle 10 is under manual longitudinal control (user-initiated torque requests), the user (e.g. driver) is likely to be perceptive of any inconsistent delay/latency between their actuation of the accelerator and the perceptible change in torque of the vehicle 10 (wheel torque).

If the switches 2140 are electrically disconnected at the time of a driver input that requires their connection, the building of electromagnetic flux and the communication latency between the inverter controller and the controller managing the torque request may be in the order of tens of milliseconds. Therefore, typically the power inverter 214 would always be maintained in its active state (all switches 2140 electrically connected) to enable an immediate response to a driver input. As a result, some quiescent electrical current draw would be tolerated.

In some use cases, different torque sources can be active at different times during a drive cycle, and the engine 202 could be repeatedly deactivated and reactivated. Therefore, the power inverter 214 is sometimes but not always required.

For example, the vehicle 10 can be operable in a plurality of selectable hybrid vehicle operating modes which may change multiple times in a journey. In one or more hybrid vehicle operating modes, the engine 202 is deactivated and the torque path 220 between the engine 202 and the first set of vehicle wheels (FL, FR) is disconnected. In another one or more of the modes, the engine 202 is re-activated and the torque path 220 may be re-connected.

In some, but not necessarily all examples the hybrid vehicle operating modes comprise an electric vehicle mode (EV mode); one or HEV modes (e.g. parallel HEV mode, Series HEV mode); and an internal combustion engine mode (ICE mode).

In EV mode, the engine 202 is inactive while the second electric machine 212 is active. The second electric machine 212, not the engine 202, is operable to deliver requested torque. Fuel injection to the engine 202 may be ceased and the torque path 220 may be disconnected.

In some examples, if a user triggers a 'kickdown' with the accelerator (e.g. 100% pedal position) in EV mode, the hybrid vehicle operating mode may transition from the EV mode to a Parallel HEV mode.

When transitioning from EV mode to Parallel HEV mode, the engine 202 is activated and connected as required in Parallel HEV mode, so that the engine 202 and second electric machine 212 are concurrently active and operable to deliver requested torque. The torque path 220 is also connected to the wheels. By combining the torque capabilities of both torque sources, the maximum torque of the vehicle 10 becomes available as required by the user's kickdown.

The kickdown in EV mode therefore satisfies an activation condition configured to cause activation of the engine 202 (transition to Parallel HEV mode).

A kickdown requires a fast response so in previous implementations the power inverter 214 would always be in its active state, as mentioned earlier. However, as mentioned earlier, maintaining the power inverter 214 in its active state at all times results in constant quiescent electrical current draw and resultant range reduction.

Kickdown is not the only example of an activation condition for exiting the EV mode and activating the engine 202. Another example activation condition comprises a system-initiated activation condition for automatically activating the engine 202 without requiring user involvement.

A first example of a system-initiated activation condition is a handover condition for causing a handover from the second electric machine 212 to the engine 202, in other words, a transition from EV mode to the ICE mode. In the ICE mode, the engine 202 is activated and connected and the second electric machine 212 is no longer operable as an electric motor (although it may still be able to generate electrical power). They driver may perceive latency if the engine 202 activates later than they expect.

A second example of a system-initiated activation condition is an assistance condition for causing the engine 202 and first electric machine 216 to generate electricity to sustain/increase energy available to the second electric machine 212, in other words, a transition from EV mode to an HEV mode. In the HEV mode, the engine 202 is activated for the purposes of electricity generation, but the torque path 220 remains disconnected. The driver may not have any expectations in relation to engine start time so may not perceive any latency. However, in other implementations the driver might be aware of an intended engine start time and therefore could conceivably notice some latency.

A system-initiated activation condition can be dependent on information indicative of energy available to the second electric machine 212, such as state of charge. The system-initiated activation condition may require at least state of charge of the energy storage means 200 to be below a threshold. Examples include a below-threshold power limit limiting the torque that can be output by the second electric machine 212, and/or other battery management information such as temperature.

According to an aspect of the disclosure, urgent activation of the engine 202 occurs sufficiently infrequently that it is worth keeping the power inverter 214 in a 'standby state' when in EV mode during a drive cycle. The power inverter 214 can be reactivated pre-emptively when an imminent urgent activation of the engine 202 is predicted. The pre-emption ensures that latency is reduced.

The standby state is configured to inhibit (reduce or stop) quiescent electrical current draw by the power inverter 214. A standby state can be achieved by electrically disconnecting the bipolar transistors 2140 from a power source (e.g. energy storage means 200). Therefore, in the standby state the power inverter 214 is not capable of providing torque request-based electrical energy throughput and the first electric machine 216 is inoperative.

Predicting imminent urgent activation of the engine 202 can be achieved using a predictive condition that monitors at least some of the information on which the aforementioned activation condition depends. For instance, the information may comprise accelerator position, and the predictive condition may be satisfied using a threshold (e.g. 75%) slightly lower than an activation condition (kickdown) threshold (e.g. 100%) to ensure that the power inverter 214 is primed for a kickdown. Accelerator position is one of several examples described herein.

In view of the above, there is provided a computer-implemented method 40 comprising: enabling the power inverter 214 to transition from an active state to a standby state in dependence on the first torque source 202 being inactive while the second torque source 212 is active (e.g. EV mode); receiving information on which an activation condition depends, the activation condition configured to cause at least activation of the first torque source 202; determining that a predictive condition for a requirement of the activation condition is satisfied, in dependence on the received information; and requesting the power inverter 214 to transition from the standby state to an active state in dependence on satisfaction of the predictive condition, to reduce its activation latency in response to the predicted (not guaranteed) satisfaction of the activation condition.

Figure 4:
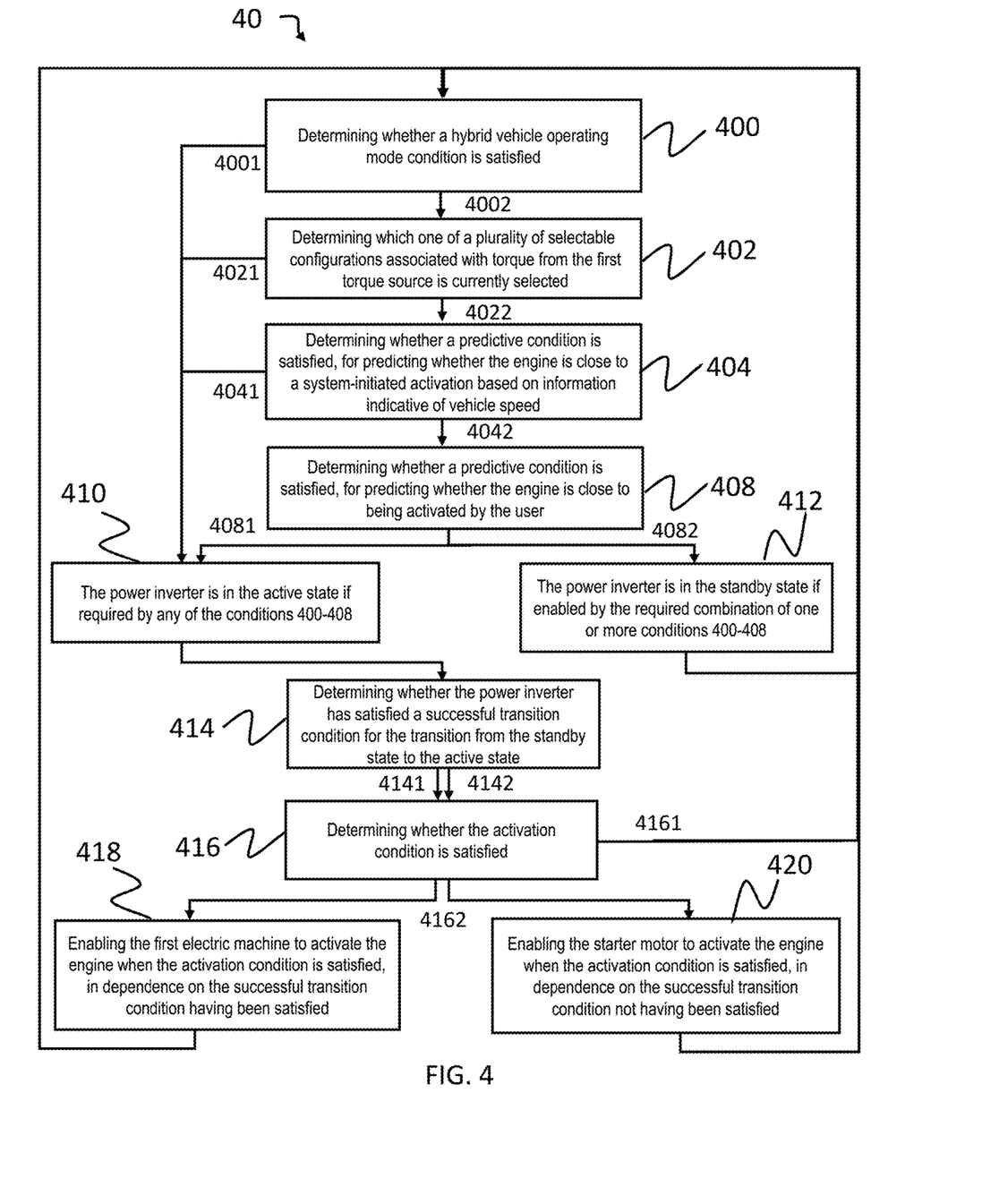
FIG. 4 illustrates an example of a method.

FIG. 4 provides an example of a detailed implementation of a computer-implemented method 40 that could be implemented by the control system 208. Any features not described as essential are optional. The illustration of FIG. 4 indicates specific values, thresholds and information types for illustrative purposes, but these specific details can change depending on the implementation. The order of the blocks can also be changed.

When referring to FIG. 4, the content of the blocks shown and described are summarised in Table 1.

TABLE 1

| | |
|---|---|
| 400 | Powertrain mode |
| 4001 | Other |
| 4002 | User selected first torque source active & second torque source inactive |
| 402 | Selected configuration |
| 4021 | Sport |
| 4022 | Drive |
| 404 | Predictive condition (speed) |
| 4041 | >50 kph |
| 4042 | <50 kph |
| 408 | Predictive condition (user) |
| 4081 | >75% accelerator |
| 4082 | <75% accelerator |
| 410 | Power inverter active state (torque mode) |
| 412 | Power inverter standby state |
| 414 | Inverter activation was success? |
| 4141 | Activated in <50 ms |
| 4142 | Did not activate in <50 ms |
| 416 | Activate first torque source? |
| 4161 | No |
| 4162 | Yes |
| 418 | Electric machine starts first torque source |
| 420 | Starter motor starts first torque source |

Blocks 400-408 refer to examples of conditions for determining whether to enable standby mode. There could be other conditions/pre-conditions such as checking whether the vehicle is powered on, which are not shown.

At block 400, the method 40 comprises determining whether a hybrid vehicle operating mode condition is satisfied. In some examples, satisfaction of the hybrid vehicle operating mode condition requires at least the EV mode to be active as a currently selected mode. This is because it may not be appropriate to allow standby mode in the HEV modes or in the ICE mode in which the first electric machine 216 is required more frequently (e.g. for energy generation).

In some, but not necessarily all, examples satisfaction of the hybrid vehicle operating mode condition of block 400 may further require that the currently selected EV mode was initiated by the driver. If the EV mode was initiated by the driver, block 400 enables the standby state to be entered subject to one or more other conditions (e.g. 404-408) being satisfied. Block 400 does not enable the standby state to be entered if the EV mode was initiated automatically (system-initiated).

In some examples, driver-initiated EV mode refers to the EV mode being selected from a HMI. In driver-initiated EV mode, the engine 202 may stay inactive and disconnected unless EV mode is manually de-selected via HMI or the driver kicks down, or activates kickdown. Accelerator pedal position can therefore be monitored to anticipate a kickdown.

In some examples, automatically-initiated EV mode refers to the situation in which a driver has selected an 'Auto mode' from a HMI, and the control system 208 has decided to enter the EV mode. The Auto mode enables the control system 208 to select hybrid vehicle (or HEV) operating modes based on a detailed algorithm including optimisation functions outside the scope of this disclosure.

Based on the above examples, engine start is predictably required less often in driver-initiated EV mode because urgent starts are generally only requested based on accelerator position. In automatically-initiated EV mode, engine starts are less predictable and based on a wide variety of different variables (including state of charge etc.) in addition to kickdown.

In another embodiment, standby mode is enabled for both driver-initiated and automatically-initiated EV modes. The method 40 may determine (select) a predictive condition depending on whether the EV mode was driver-initiated or was automatically-initiated. For driver-initiated EV mode, a predictive condition based on accelerator position may be determined. For automatically-initiated EV mode, additional or alternative predictive conditions may be determined to account for the extra possible reasons for requesting engine activation, such as conditions based on state of charge or power limits.

At block 402, the method 40 comprises determining which one of a plurality of selectable configurations associated with torque from the first torque source 202 is currently selected. Enabling the standby state is dependent on which one of the configurations is currently selected.

In some examples, the selectable configurations comprise transmission configurations for the transmission 204. The configurations may include 'Drive' or 'Sport' for an automatic transmission 204. The configurations may be user-selectable via a gear selector or other HMI.

The configurations may comprise different shift maps for the transmission 204. A first configuration (e.g. Drive) may comprise a lower upshift point for a given engine operating point (f(speed,load)), and a second configuration (e.g. Sport) may comprise a higher upshift point for the same engine operating point.

If the first configuration (Drive) is selected, block 402 enables the standby state to be entered subject to one or more other conditions (e.g. 404, 408) being satisfied. If the second configuration (Sport) is selected, Block 402 does not enable the standby state to be entered. This is because the second configuration indicates that the user intends to keep the engine active.

While the above block 402 refers to transmission configurations, it would be appreciated that the same logic could be applied to other configurations such as driving dynamics modes. Driving dynamics modes are sets of configurations for a plurality of vehicle subsystems (e.g. transmission 204, active suspension, torque source), not limited to one subsystem. Standby may be enabled for a first driving dynamics mode, but not for a second driving dynamics mode associated with sporty or off-road driving characteristics.

At block 404, the method 40 comprises determining whether a predictive condition is satisfied, for predicting whether the engine 202 is close to a system-initiated activation based on information indicative of vehicle speed. The information may indicate vehicle speed over ground, for example. Enabling the standby state is dependent on the information indicative of vehicle speed.

If the information indicative of vehicle speed is below a threshold, block 404 enables the standby state to be entered, optionally subject to one or more other conditions (e.g. 408) being satisfied. If the information indicative of vehicle speed is above a threshold, block 404 does not enable the standby state to be entered.

Block 404 is useful if an activation condition based on vehicle speed is implemented, such as a system-initiated handover condition that hands over from the second electric machine 212 to the engine 202 at a high vehicle speed. This is because the active state can be entered pre-emptively and maintained while the handover speed is approached, to reduce handover latency.

In some examples, the threshold of block 404 is a value selected from the range approximately 30 kilometres per hour to approximately 120 kilometres per hour, such as approximately 50 kilometres per hour. The threshold may comprise hysteresis. The second higher threshold speed for handover may be selected from the range approximately 80 kilometres per hour to approximately 180 kilometres per hour, such as approximately 130 kilometres per hour. The second threshold may comprise hysteresis.

Block 404 therefore enables the standby mode to be entered during a drive cycle while the vehicle 10 is progressing (e.g. cruising/accelerating) at speeds below the threshold.

At block 408, the method 40 comprises determining whether a predictive condition is satisfied, for predicting whether the engine 202 is close to being activated by the user.

In the example of kickdown, the predictive condition is for the kickdown requirement of the activation condition (kickdown condition). The predictive condition is configured to predict an imminent kickdown requiring engine activation.

In order to predict an imminent kickdown, the predictive condition is dependent on at least some of the same information on which the activation condition depends. For kickdown, the information comprises information indicative of a request for torque. The information can be a variable.

In order to predict an imminent kickdown, the predictive condition can be satisfied when the value of the information is close to the value required for kickdown. For example, the predictive condition can be configured to be satisfied when the information exceeds a first threshold that is close to a second threshold (kickdown threshold) for satisfying the activation condition.

Figure 5:
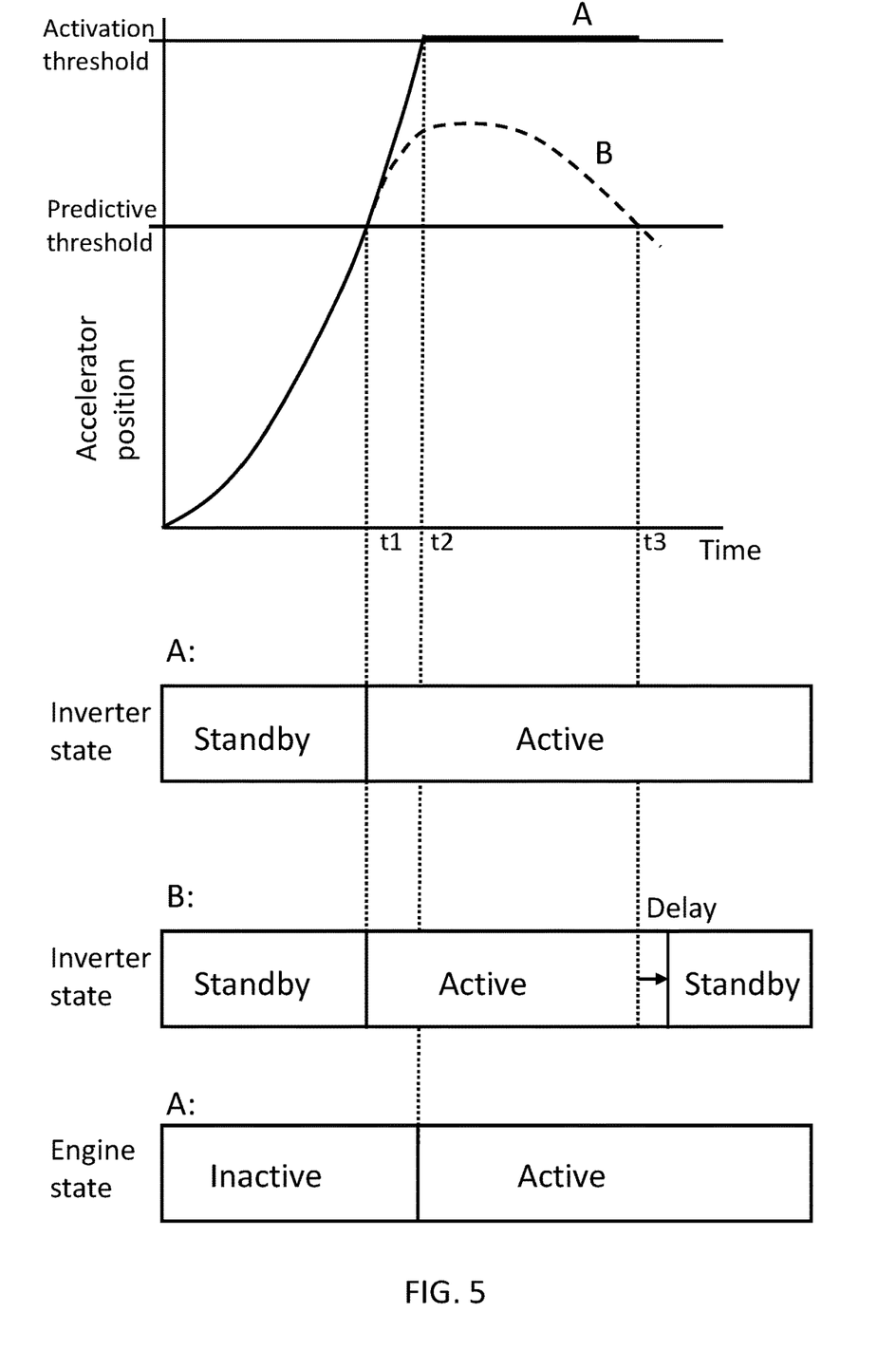
FIG. 5 graphically illustrates an example use case for activating and deactivating a power inverter based on accelerator position.

FIG. 5 graphically illustrates an example with the information (accelerator position) on the y-axis, and time on the x-axis. The 'predictive threshold' is the first threshold and the 'activation threshold' is the second greater threshold.

In scenario A (solid line), the accelerator position is initially below the first threshold so block 408 enables the power inverter 214 to enter/remain in standby state. The accelerator position then passes the first threshold at time t1. As a result, the predictive condition is satisfied so block 408 causes a transition from the standby state to the active state.

A transition from the standby state to the active state may take less than 50 milliseconds to complete, in an implementation.

In scenario A, the accelerator position then passes the second threshold at time t2. As a result, the activation condition is satisfied so a kickdown occurs which activates the engine 202. Even if the driver presses the accelerator quickly, the time taken to press the accelerator to the second threshold may be longer than the time required to activate the power inverter 214.

In scenario B (dashed line), the accelerator position passed the first threshold but does not pass the second threshold. Instead, the accelerator position stays between the first and second thresholds for a period of time before dropping below the first threshold at time t3. As a result of falling below the first threshold, block 408 can initiate a transition from the active state to the standby state. The transition may occur at time t3, or a short predetermined delay thereafter in case of a change of mind.

The predetermined delay may be a value selected from the range approximately 0.3 seconds to approximately 2 minutes. In an example, the predetermined delay is 1 second, within the optimum range 0.5-10 seconds for a balance between change-of-mind and efficiency.

Regarding specific values of the thresholds, a high value of the first threshold enables the power inverter 214 to spend longer in standby. Therefore, the first threshold can be greater than approximately 50% of the upper limit value (100%) of accelerator position, or more advantageously greater than approximately 60%. The first threshold should be sufficiently below the second threshold to give time for the power inverter 214 to activate. Therefore, the first threshold can be less than approximately 80% of accelerator position. In an implementation, the first threshold is approximately 75% of accelerator position.

The value of the second threshold can be approximately 100% of accelerator position. That is, the accelerator has reached its end of travel by the time kickdown is initiated. Alternatively, the second threshold may have a slightly lower value to allow some post-kickdown travel, such as greater than approximately 90% (but still more than approximately 10% greater than the first threshold).

In the above example, accelerator position is mapped to the predictive and activation conditions. In other examples, a different type of information similar to accelerator position is mapped to the predictive and activation conditions. Accelerator position is one of several examples of information indicative of a user-initiated request for torque, that could be mapped.

Another example of information indicative of a user-initiated request for torque is the torque request that is derived from the accelerator position. The torque request can be a function of accelerator position but may not have a direct 1:1 relationship with accelerator position, due to other functions outside the scope of this disclosure.

The decision of whether to use accelerator position or a torque request can depend on the vehicle 10 itself. If the second electric machine 212 is capable of delivering high torque in EV mode, the second threshold can optionally be linked to a static accelerator position threshold so the driver can always tell how close they are to kickdown. Alternatively, and especially if the second electric machine 212 is not capable of delivering high torque in EV mode, the second threshold may be linked to the torque request and/or the second threshold may be variable because engine assistance may be required more often.

If the second threshold is variable, it would be appreciated that the first threshold could be variable too, such as an offset below the second threshold.

In some, but not necessarily all examples the predictive condition of block 408 is not based exclusively on information indicative of an automatically-initiated request for torque. Therefore, autonomous driving functions such as cruise control are excluded, because such functions automatically initiate torque requests based on a driver/system-determined speed setpoint. Note that a driver speed setpoint is not an example of information indicative of a user-initiated request for torque.

As explained earlier in the disclosure, accelerator position and/or torque request and/or vehicle speed are not the only examples of information that can be mapped to the predictive and activation conditions. For example, other system-initiated activation conditions for activating the engine 202 are possible. If applied to this method 40, the predictive and activation conditions can be mapped to the information indicative of the capability of the second electric machine 212 to operate (e.g. state of charge, power limit, etc.). This information can be analogously described as the capability to remain in EV mode, or how much EV mode is left.

In an example use case, the power inverter 214 is activated pre-emptively just before running out of EV mode. The first and second thresholds can be mapped to this capability-related information. The first threshold is now just above the second threshold. Therefore, when the capability to remain in EV mode falls below the first threshold, the power inverter 214 is activated ahead of the expected engine activation. If the information is state of charge, the first threshold for pre-emptively activating the power inverter 214 could be a value selected from the range approximately 2% to approximately 35%. The second threshold for activating the engine 202 could be a value selected from the range approximately 1% to approximately 30%. In other words, the delta between inverter activation and engine start could be between 1% and 5%.

Referring back to FIG. 4, the next two blocks 410 and 412 indicate states of the power inverter 214. FIG. 4 could alternatively be illustrated as one or more state machines. At block 410, the power inverter 214 is in the active state if required by any of the conditions 400-408. At block 412, the power inverter 214 is in the standby state if enabled by the required combination of one or more conditions 400-408.

In FIG. 4, the next set of operations 414, 416, 418, 420 monitor the activation condition and define a further optional feature for vehicles (e.g. FIG. 2) that have a plurality of different means for starting the engine 202. In summary, it is determined whether power inverter 214 met certain criteria for a successful activation. If so, the method 40 pre-selects the first electric machine 216 (starter-generator) for activating the engine 202, resulting in a faster start and improved refinement compared with using the starter motor. If not satisfied, the method 40 pre-selects the starter motor 206 for activating the engine 202.

In full, block 414 comprises determining whether the power inverter 214 has satisfied a successful transition condition for the transition from the standby state to the active state. The successful transition condition may be dependent on whether the transition from the standby state to the active state was completed within a time limit. The time limit may be in the order of approximately 50 milliseconds, or another value selected from the range approximately 10 milliseconds to approximately 0.2 seconds. The time limit benefits from being this short time duration because a decision of which starting method to use should be made before the engine 202 needs to be started. However, if the timer is still running when the activation condition is satisfied, engine start may optionally be delayed until the inverter reactivation completes or has been assessed as failed. Alternatively, the starter motor 206 may be used in that situation. The time limit benefits from not being too short, otherwise the starter motor 206 may be used excessively.

Block 416 comprises determining whether the activation condition is satisfied. The activation condition has already been described above (e.g. kickdown-based and/or vehicle speed-based). If the activation condition is not satisfied, the method 40 may loop back to provide continuous monitoring. The method 40 may loop back to before whichever ones of the conditions 400-408 need to be monitored continuously. If the activation condition is satisfied, the method 40 proceeds.

Block 418 comprises enabling the first electric machine 216 to activate the engine 202 when the activation condition is satisfied, in dependence on the successful transition condition having been satisfied. For example, the first electric machine 216 activated within the time limit.

Block 420 comprises enabling the starter motor 206 instead of the first electric machine 216 to activate the engine 202 when the activation condition is satisfied, in dependence on the successful transition condition not having been satisfied. For example, the first electric machine 216 failed to activate within the time limit so now the starter motor 206 is used.

Blocks 414-420 can define a method in their own right, comprising: enabling (412) the power inverter 214 to transition from the active state to the standby state in dependence on the first torque source 202 being inactive, wherein the standby state is configured to inhibit quiescent electrical current draw by the power inverter 214; determining (408) satisfaction of a condition indicative of requiring activation of the power inverter 214; requesting (410) the power inverter 214 to transition from the standby state to the active state in dependence on satisfaction of the condition; determining (414) whether the power inverter 214 has satisfied a successful transition condition for transitioning from the standby state to the active state; in dependence on satisfaction of the successful transition condition, enabling (418) the electric machine to activate the first torque source 202; and in dependence on non-satisfaction of the successful transition condition, enabling (420) a starter motor not dependent on the power inverter 214 to activate the first torque source 202.

From the above disclosure, a non-limiting implementation of the method of FIG. 4 can be summarised according to the following logical control elements:
 (1) Detection of a system state (block 412) which can support steady-state EV mode and therefore power inverter standby; based on driver selected powertrain mode & gear position (blocks 400, 402), battery state of charge (option to block 408), vehicle speed (block 404), non-presence of "system induced" engine start requests (e.g. associated with automatically-initiated EV mode) and current engine/inverter state (block 410 or 412).
 (2) Detection of driver behaviour (block 408 accelerator position) which is likely to induce an engine start within the next ~100 ms.

In this non-limiting implementation, if the system state which can support steady-state EV mode is detected, and the driver behaviour is assessed as being unlikely to induce an imminent engine start, then the power inverter 214 can be requested to enter a standby state ("Standby" mode) to minimise quiescent current draw, else the power inverter 214 shall be requested to enter an active state ("Torque" mode), conditional on the non-presence of higher priority requests.

A possible calibration restricts functionality to a driver-selected powertrain mode "Selectable EV" (block 400). In this mode, the only driver behaviour which can induce an engine start is to press the accelerator to ~100%. This makes the implementation of Control Block (2) a function of pedal position (e.g. >75%). The mechanical time for a human driver to press the accelerator from 75% to 100% is typically sufficient to have the power inverter 214 fully primed to start the engine 202 at the point 100% pedal is reached. It is acknowledged that false positives may occur, i.e. applications of >75% pedal without reaching 100% pedal. In these cases, the system briefly behaves as per a conventional system, with the power inverter 214 prepared to deliver torque+associated power draw. The inverter is put back into Standby mode when pedal position reduces below 75% and a debounce time (e.g. ~1 second) elapses.

Another logical control element is (3) the maximum time-out for the power inverter 214 to re-enter torque mode when requested. If this timeout is reached, the engine 202 is started with a backup start device 206.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

The blocks illustrated in FIG. 4 may represent steps in a method and/or sections of code in the computer program 306. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, the vehicle may be a Series HEV if it is beneficial to minimise engine start time.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for controlling a power inverter of a vehicle, the vehicle comprising a first torque source, the power inverter for an electric machine coupled to the first torque source, and a second torque source, the control system comprising one or more controllers, wherein the control system is configured to:
    enable the power inverter to transition from an active state to a standby state in dependence on the first torque source being inactive while the second torque source is active, wherein the standby state is configured to inhibit quiescent electrical current draw by the power inverter;
    receive information on which an activation condition depends, the activation condition configured to cause at least activation of the first torque source;
    determine that a predictive condition for a requirement of the activation condition is satisfied, in dependence on the received information; and
    request the power inverter to transition from the standby state to an active state in dependence on satisfaction of the predictive condition.

2. The control system of claim 1, wherein the received information comprises information indicative of a request for torque.

3. The control system of claim 2, wherein the predictive condition is configured to be satisfied when the information indicative of a request for torque exceeds a threshold.

4. The control system of claim 3, wherein the value of the threshold is below a different threshold for satisfaction of the activation condition, so that the predictive condition is satisfiable before the activation condition but the activation condition is not satisfiable before the predictive condition.

5. The control system of claim 2, wherein the predictive condition is dependent on the information indicative of a request for torque indicating a user-initiated request for torque but is not based exclusively on information indicating an automatically-initiated request for torque.

6. The control system of claim 2, wherein the activation condition is configured to be satisfied when the information indicative of a request for torque exceeds an activation threshold; optionally the activation threshold is a value configured to be reachable after the predictive condition has been satisfied.

7. The control system of claim 1, wherein the activation condition comprises a system-initiated activation condition for causing activation of the first torque source, and wherein the received information comprises information capable of satisfying, at least in part, the system-initiated activation condition.

8. The control system of claim 1, wherein enabling the power inverter to transition from the active state to the standby state is further dependent on which, of a plurality of selectable configurations associated with torque from the first torque source, is currently selected.

9. The control system of claim 1, wherein in the standby state, one or more bipolar transistors of the power inverter are electrically disconnected.

10. The control system of claim 1, configured to delay initiation of the transition from the active state to the standby state but not delay initiation of the transition from the standby state to the active state.

11. The control system of claim 1, configured to:
    determine whether the power inverter has satisfied a successful transition condition for the transition from the standby state to the active state;

in dependence on satisfaction of the successful transition condition, enable the electric machine to activate the first torque source when the activation condition is satisfied; and in dependence on non-satisfaction of the successful transition condition, enable a starter motor not dependent on the power inverter to activate the first torque source when the activation condition is satisfied.

12. The control system of claim 1, configured to:
determine whether an electric vehicle mode causing the first torque source to be inactive while the second torque source is active was initiated by a driver or was initiated automatically; and
in dependence on the determination, either:
enable the transition from the active state to the standby state if the electric vehicle mode was initiated by the driver but not if the electric vehicle mode was initiated automatically; or
determine at least the predictive condition depending on whether the electric vehicle mode was initiated by the driver or was initiated automatically.

13. The control system of claim 1, wherein the first torque source comprises an internal combustion engine and/or wherein the electric machine comprises a starter-generator and/or wherein the second torque source comprises an electric machine.

14. A method of controlling a power inverter of a vehicle, the vehicle comprising a first torque source, and the power inverter for an electric machine coupled to the first torque source, the method comprising:
enabling the power inverter to transition from an active state to a standby state in dependence on the first torque source being inactive while a second torque source is active, wherein the standby state is configured to inhibit quiescent electrical current draw by the power inverter;
receiving information on which an activation condition depends, the activation condition configured to cause at least activation of the first torque source;
determining that a predictive condition for a requirement of the activation condition is satisfied, in dependence on the received information; and
requesting the power inverter to transition from the standby state to an active state in dependence on satisfaction of the predictive condition.

15. A control system for controlling a power inverter of a vehicle, the vehicle comprising a first torque source, and the power inverter for an electric machine coupled to the first torque source, the control system comprising one or more controllers, wherein the control system is configured to:
enable the power inverter to transition from an active state to a standby state in dependence on the first torque source being inactive, wherein the standby state is configured to inhibit quiescent electrical current draw by the power inverter;
determine satisfaction of a condition indicative of requiring activation of the power inverter;
request the power inverter to transition from the standby state to an active state in dependence on satisfaction of the condition;
determine whether the power inverter has satisfied a successful transition condition for transitioning from the standby state to the active state;
in dependence on satisfaction of the successful transition condition, enable the electric machine to activate the first torque source; and
in dependence on non-satisfaction of the successful transition condition, enable a starter motor not dependent on the power inverter to activate the first torque source.

16. A vehicle comprising the control system of claim 1.

17. Computer software that, when executed, is arranged to perform a method according to claim 14.

18. The control system of claim 2, wherein the information indicative of a request for torque is based on accelerator position.

19. The control system of claim 7, wherein the information capable of satisfying, at least in part, the system-initiated activation condition comprises information indicative of energy available to the second torque source.

20. The control system of claim 11, wherein the successful transition condition is dependent on whether the transition from the standby state to the active state is completed within a time limit.

* * * * *